US 6,739,418 B2

(12) United States Patent
Ogata et al.

(10) Patent No.: US 6,739,418 B2
(45) Date of Patent: May 25, 2004

(54) ENGINE OPERATION CONTROLLER FOR HYBRID ELECTRIC VEHICLE

(75) Inventors: Makoto Ogata, Tokyo (JP); Takashi Yanase, Tokyo (JP); Yuta Susuki, Tokyo (JP); Nobuaki Takeda, Tokyo (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 215 days.

(21) Appl. No.: 10/018,961

(22) PCT Filed: Apr. 26, 2001

(86) PCT No.: PCT/JP01/03641

§ 371 (c)(1),
(2), (4) Date: Dec. 27, 2001

(87) PCT Pub. No.: WO01/83967

PCT Pub. Date: Nov. 8, 2001

(65) Prior Publication Data

US 2002/0157883 A1 Oct. 31, 2002

(30) Foreign Application Priority Data

Apr. 27, 2000 (JP) ......................................... 2000-127756

(51) Int. Cl.$^7$ ............................................. B60K 41/20
(52) U.S. Cl. ..................... 180/65.2; 180/65.3; 477/107; 123/179.4
(58) Field of Search ............................. 180/65.4, 65.2, 180/65.3; 477/183, 185, 187, 116, 107; 701/1, 54; 123/179.3, 179.4

(56) References Cited

U.S. PATENT DOCUMENTS

| 3,898,475 A | * | 8/1975 | Mogi .......................... 180/270 |
| 4,286,683 A | * | 9/1981 | Zeigner et al. ............. 180/54.1 |
| 5,653,659 A | * | 8/1997 | Kunibe et al. ............... 477/111 |
| 5,965,991 A | | 10/1999 | Koike et al. |
| 6,190,284 B1 | * | 2/2001 | Kuroda et al. ............... 477/107 |
| 6,275,759 B1 | * | 8/2001 | Nakajima et al. ............. 701/54 |
| 6,283,086 B1 | * | 9/2001 | Yamamoto et al. ...... 123/198 D |
| 6,358,180 B1 | * | 3/2002 | Kuroda et al. .................. 477/4 |
| 6,371,889 B1 | * | 4/2002 | Kuroda et al. ............... 477/181 |
| 6,469,402 B2 | * | 10/2002 | Morimoto et al. ......... 290/40 C |
| 6,494,809 B1 | * | 12/2002 | Suzuki et al. ............... 477/107 |
| 6,504,259 B1 | * | 1/2003 | Kuroda et al. ............. 290/40 C |
| 6,532,926 B1 | * | 3/2003 | Kuroda et al. ............ 123/179.4 |

FOREIGN PATENT DOCUMENTS

| JP | 10-4602 A | 1/1998 |
| JP | 2000-8889 A | 1/2000 |
| JP | 2000-345878 A | 12/2000 |
| JP | 2001-140673 A | 5/2001 |

* cited by examiner

*Primary Examiner*—Brian L. Johnson
*Assistant Examiner*—J. Allen Shriver
(74) *Attorney, Agent, or Firm*—Birch, Stewart, Kolasch & Birch, LLP

(57) ABSTRACT

An engine operation controller for a hybrid electric automobile is equipped at least with a motor and an engine. The engine operation controller is provided with a speed detection section for detecting the speed of the vehicle, a control section for controlling operation of the engine, and a decision section for deciding whether or not a stop of the vehicle is a stop at a stopping place. If it is detected by the speed detection section that the speed is less than a predetermined value, operation of the engine is prohibited by the control section. Furthermore, a delay section is provided for delaying removal of the operation prohibition of the engine when it is decided by the decision section that the stop of the vehicle is a stop at a stopping place.

5 Claims, 13 Drawing Sheets

CHARGED-LEVEL BASED POWER GENERATION CONTROL

WARMING-UP FACILITATION CONTROL

CLOSING OF THE DOOR DURING A STOP

CLOSING OF THE DOOR DURING A STOP

ENGINE OPERATION CONTROLLER FOR HYBRID ELECTRIC VEHICLE

This application is the national phase under 35 U.S.C. § 371 of PCT International Application No. PCT/JP01/03641 which has an International filing date of Apr. 26, 2001, which designated the United States of America.

TECHNICAL FIELD

The present invention relates to an engine operation controller for a hybrid electric automobile, and more particularly to an engine operation controller for a hybrid electric automobile, suitable for use with a route bus, etc.

BACKGROUND ART

From the viewpoint of environmental protection, idling stop vehicles (called also idle stop vehicles), in which operation of the engine is automatically stopped when the vehicle is stopped, have recently been put to practical use. The idling stop vehicles are now spreading among route buses with a diesel engine. If such an idling stop is utilized, exhaust gas can be reduced and fuel consumption can be enhanced.

On the other hand, hybrid electric automobiles, in which an internal combustion engine and a motor are combined to obtain driving force, have hitherto been developed and put to practical use. The hybrid electric automobiles include a series hybrid electric automobile, which employs an engine as a power supply source for a motor, and a parallel hybrid electric automobile, in which the output shaft of an engine and the output shaft of a motor are both connected mechanically to a driving shaft.

The above-mentioned idling stop, incidentally, can be utilized in the hybrid electric automobiles. For example, when electric power for driving a motor is accumulated to more than a certain degree, operation of the engine is stopped if the speed of the vehicle is a predetermined speed or less, and the vehicle is driven only by the driving force of the motor.

However, in the case where the conventional idling stop technique and the conventional hybrid electric automobile technique are simply combined together, the following problems arise. For instance, in a vehicle such as a route bus that passengers get on and off, if the speed of the vehicle at which the engine is restarted is low, there are cases where operation of the engine is started immediately after the vehicle shifts from the stopped state to the traveling state. In such a case, some passengers at a stopping place may be given an unpleasant feeling by exhaust gas discharged by sudden starting of the engine. Note that if a speed at which the engine is restarted is set high, the above-mentioned problem can be eliminated. However, each time the vehicle is stopped at a traffic signal, etc., the stoppage time of the engine becomes long and therefore the amount of charge in the battery is reduced. As a result, the traveling performance may be lowered.

The present invention has been made in view of the problems mentioned above. Accordingly, it is an object of the present invention to provide an engine operation controller for a hybrid electric automobile that is capable of avoiding the situation in which passengers are given an unpleasant feeling by the engine restarted at a stopping place and in which passengers are frightened by engine-starting noise, when the idling stop technique is applied to a hybrid electric automobile. Another object of the present invention is to provide an engine operation controller for a hybrid electric automobile which is capable of assuring the amount of charge of the battery.

DISCLOSURE OF INVENTION

To achieve the objects of the present invention mentioned above, there is provided a first engine operation controller for a hybrid electric automobile equipped at least with a motor and an engine, comprising: speed detection means for detecting speed of the vehicle; control means for controlling operation of the engine; and decision means for deciding whether or not a stop of the vehicle is a stop at a stopping place;

wherein, if it is detected by the speed detection means that the speed is less than a predetermined value, operation of the engine is prohibited by the control means; and delay means is provided for delaying removal of the operation prohibition of the engine when it is decided by the decision means that the stop of the vehicle is a stop at a stopping place.

Therefore, according to the first engine operation controller of the present invention, when a stop of the vehicle is a stop at a stopping place, the removal of the operation prohibition of the engine is delayed, compared with the case where the vehicle is standing at a traffic signal, etc. As a result, the present invention is capable of avoiding the situation in which passengers at a bus stop are exposed to exhaust gas and are frightened by engine-starting noise, while assuring the amount of charge of the battery. On the other hand, when a stop of the vehicle is not a stop at a stopping place, the operation prohibition of the engine is removed at relatively short timing and therefore a reduction in the amount of charge of the battery is prevented.

The first engine operation controller of the present invention may further comprise door detection means for detecting an open or closed state of a door of the vehicle. In this case, when an open or closed state of the door is detected by the door detection means, the decision means decides that the stop of the vehicle is a stop at a stopping place, and the removal of the operation prohibition of the engine is delayed.

With this construction, the stop of the vehicle at a stopping place is suitably decided. Therefore, when the vehicle is standing at a stopping place, the situation is avoided in which passengers at the stopping place are exposed to exhaust gas and are frightened by engine-starting noise. On the other hand, when an open or closed state of the door is not detected by the door detection means, it is decided that the stop of the vehicle is not a stop at a stopping place, and the operation prohibition of the engine is removed at relatively short timing. As a result, a reduction in the amount of charge of the battery is prevented.

In accordance with the present invention, there is provided a second engine operation controller for a hybrid electric automobile equipped at least with a motor and an engine, comprising: speed detection means for detecting speed of the vehicle; door detection means for detecting an open or closed state of a door of the vehicle; and control means for controlling operation of the engine;

wherein, if it is detected by the speed detection means that the speed is less than a first predetermined value, operation of the engine is prohibited by the control means;

thereafter, when an open or closed state of the door is not detected by the door detection means, the operation prohibition of the engine is removed by the control means if the speed becomes equal to or greater than a second predetermined value which is greater than the first predetermined value; and when an open or closed state of the door is detected by the door detection means, the operation prohibition of the engine is removed by the control means if the speed becomes equal to or greater than a third predetermined value which is greater than the second predetermined value.

Therefore, when the speed of the vehicle becomes less than the first predetermined value and the engine is stopped, and then the door is not opened or closed, the operation inhibition of the engine is removed at relatively short timing. As a result, a reduction in the amount of charge of the battery is prevented. When an open or closed state of the door is detected after the stop of the vehicle, the operation prohibition of the engine is held until the speed of the vehicle becomes equal to or greater than the third predetermined value which is greater than the second predetermined value. Therefore, even when it takes time to get on and off, the present invention is capable of avoiding the situation in which, when the vehicle is started, the engine is restarted at a bus stop and passengers are exposed to exhaust gas and are frightened by engine-starting noise.

In accordance with the present invention, there is provided a third engine operation controller for a hybrid electric automobile equipped at least with a motor and an engine, comprising: speed detection means for detecting speed of the vehicle; door detection means for detecting an open or closed state of a door of the vehicle; and control means for controlling operation of the engine;

wherein, if it is detected by the speed detection means that the speed is less than a first predetermined value, operation of the engine is prohibited by the control means;

thereafter, when an open or closed state of the door is not detected by the door detection means, the operation prohibition of the engine is removed by the control means if a first predetermined time elapses; and when an open or closed state of the door is detected by the door detection means, the operation prohibition of the engine is removed by the control means if a second predetermined time greater than the first predetermined time elapses.

Therefore, when the speed of the vehicle becomes less than the first predetermined value and the engine is stopped, and then the door is not opened or closed, the operation inhibition of the engine is removed, if the first predetermined time that is relatively short elapses after the stop of the engine. The first predetermined time is set to an average time during which a vehicle is standing at a traffic signal. Therefore, after the vehicle is started, restarting of the engine is permitted at relatively short timing. As a result, a reduction in the amount of charge of the battery is prevented.

On the other hand, when the speed of the vehicle becomes less than the first predetermined value and the vehicle is stopped, and then an open or closed state of the door is detected, the operation prohibition of the engine is removed when the second predetermined time greater than the first predetermined time elapses. In this manner, restarting of the engine is permitted. In the case where the vehicle is a route bus, the second predetermined time is set to an average time needed for the vehicle to move away enough from a bus stop after passengers get on and off at the bus stop. Therefore, the present invention is capable of avoiding the situation in which, when the vehicle is started, the engine is restarted at a bus stop and passengers are exposed to exhaust gas and are frightened by engine-starting noise.

In accordance with the present invention, there is provided a fourth engine operation controller for a hybrid electric automobile equipped at least with a motor and an engine, comprising: speed detection means for detecting speed of the vehicle; door detection means for detecting an open or closed state of a door of the vehicle; and control means for controlling operation of the engine;

wherein, if it is detected by the speed detection means that the speed is less than a first predetermined value, operation of the engine is prohibited by the control means;

thereafter, when an open or closed state of the door is not detected by the door detection means, the operation prohibition of the engine is removed by the control means, if a first predetermined time elapses and, in addition, the speed becomes equal to or greater than a second predetermined value which is greater than the first predetermined value; and when an open or closed state of the door is detected by the door detection means, the operation prohibition of the engine is removed by the control means, if a second predetermined time greater than the first predetermined time elapses and, in addition, the speed becomes equal to or greater than a third predetermined value which is greater than the second predetermined value.

Therefore, when it is detected that the speed of the vehicle becomes less than the first predetermined value and, after the operation prohibition of the engine, an open or closed state of the door is not detected by the door detection means, the operation inhibition of the engine is held until the condition that the first predetermined time elapses, and the condition that the speed reaches the second predetermined value, are satisfied. Thereafter, if these conditions are satisfied, the operation prohibition of the engine is removed by the control means. Therefore, after the vehicle is started, restarting of the engine is permitted at relatively short timing. As a result, a reduction in the amount of charge of the battery is prevented. In addition, by providing the first predetermined time, the present invention is capable of preventing the repetition (hunting) of operation and stop of the engine 4 when the speed of the vehicle reaches the second predetermined value immediately after the speed becomes less than the first predetermined value, because of a traffic snarl, etc.

On the other hand, when the speed of the vehicle becomes less than the first predetermined value and operation of the engine is prohibited, and then an open or closed state of the door is detected by the door detection means, the operation prohibition of the engine is held until the condition that the second predetermined time greater the first predetermined time elapses, and the condition that the speed reaches the third predetermined value greater than the second predetermined value, are satisfied. Thereafter, if these conditions are satisfied, the operation prohibition of the engine is removed by the control means. In the case where the vehicle is a route bus, the second predetermined time is set to an average time needed for the vehicle to start after passengers get on and off at a bus stop. Therefore, the present invention is capable of avoiding the situation in which, when the vehicle is started, the engine is restarted at a bus stop and passengers are exposed to exhaust gas and are frightened by engine-starting noise. In addition, even if the second predetermined time elapses, restarting of the engine is prohibited until the speed of the vehicle becomes the third predetermined value or greater. Therefore, even if it takes time to get on and off, the present invention is capable of reliably avoiding the situation in which passengers are exposed to exhaust gas and are frightened by engine-starting noise.

BRIEF DESCRIPTION OF DRAWINGS

The present invention will be described in further detail with reference to the accompanying drawings wherein.

BEST MODE FOR CARRYING OUT THE INVENTION

Figure 1:
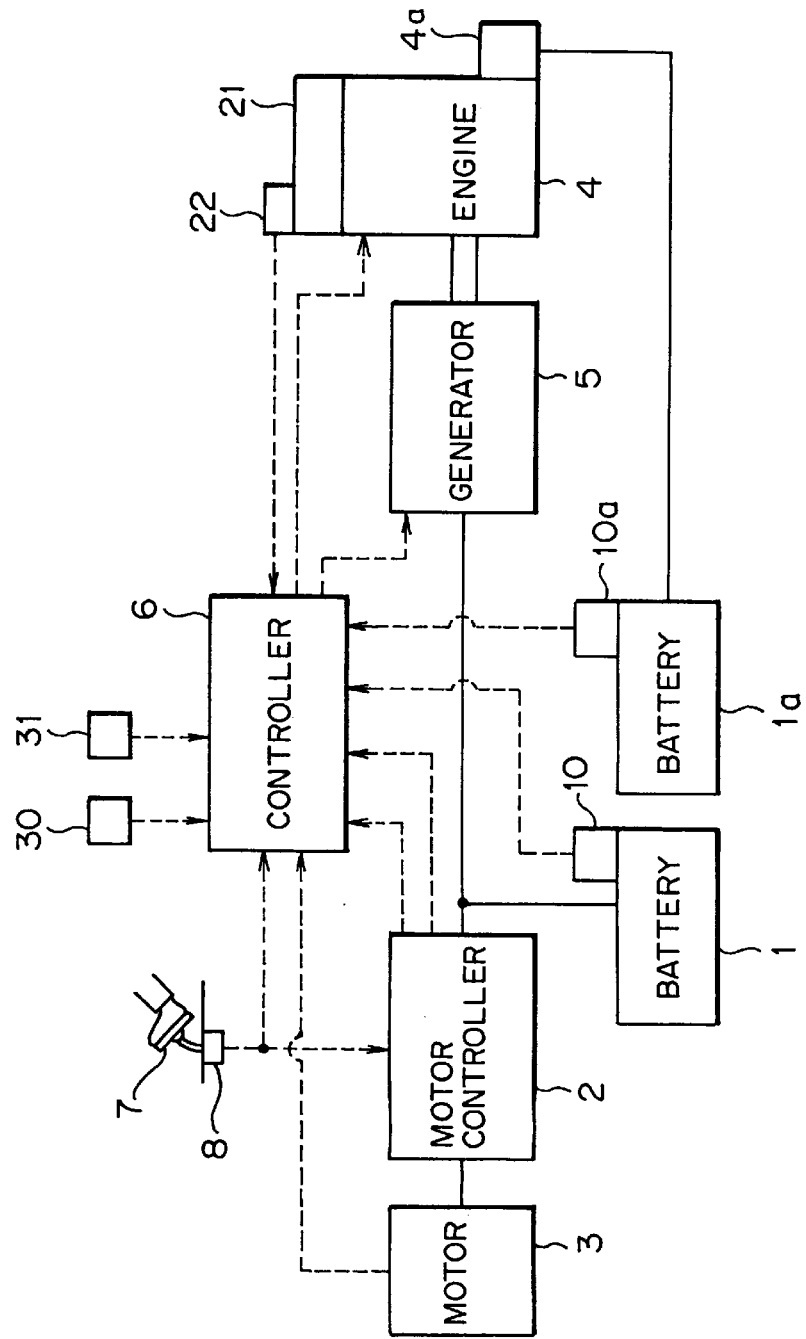
FIG. 1 is a schematic block diagram showing an engine operation controller for a hybrid electric automobile, constructed according to a preferred embodiment of the present invention.

An engine operation controller for a hybrid electric automobile, constructed according to a preferred embodiment of the present invention, will hereinafter be described in detail with reference to the drawings. FIG. 1 is a view showing a frame format of the whole composition. Note that the engine operation controller of the preferred embodiment is applied to a route bus.

As shown in FIG. 1, the hybrid electric automobile is equipped with a main battery 1, which is electrically connected to a motor 3 through a motor controller 2. The motor 3 is connected to the driving wheel side (not shown) of the vehicle, and rotation of the motor 3 causes the hybrid electric automobile to travel.

The hybrid electric automobile is also equipped with an engine 4. The output side of the engine 4 is mechanically connected with a generator 5, which supplies electric power to both the main battery 1 and the motor 3. If the generator 5 is driven by the engine 4, the main battery 1 will be charged.

The vehicle is provided with a controller (control means) 6 to which various sensors are connected. The operations of the engine 4 and the generator 5 are controlled based on a control signal from the controller 6. An accelerator pedal position sensor 8 is attached to an accelerator pedal 7 so that a signal, corresponding to the accelerator pedal position of the accelerator pedal 7 depressed by the driver, is input to both the motor controller 2 and the controller 6. Based on the output signal from the accelerator pedal position sensor 8, the motor controller 2 outputs a control signal to the motor 3 to drive the motor 3.

The main battery 1 and an auxiliary battery 1a (e.g., 24 V) are provided with residual capacity meters (specific gravity meters) 10 and 10a, respectively. The residual capacities of the batteries 1, 1a are detected by the specific gravity meters 10, 10a and are input to the controller 6. Normally, if the residual capacities of the batteries 1, 1a become a specified value or less, the engine 4 is operated so that the batteries 1, 1a are charged by the generator 5 and an alternator 4a.

The engine 4 is provided with a water temperature sensor 22 that detects the temperature of cooling water within a water jacket 21. In addition, although not shown, the vehicle is provided with a pressure sensor which detects the air pressure of the operating fluid of the brake, and an engine room sensor which detects the open or closed state of the engine room. Furthermore, the vehicle of the preferred embodiment is provided with a speed sensor (speed detection means) 30 that detects speed of the vehicle, and a door switch (door detection means) 31 that detects an open or closed state of doors. In the preferred embodiment, the door switch 31 is switched on if any of the doors of the vehicle is opened.

Next, a description will be given of the power generation control in the hybrid electric automobile. From various factors including the engine operation control of the present invention, it is determined for each fixed control cycle which value the final quantity of power generated or generator speed is set to, and it is also determined whether engine operation is permitted or prohibited. Then, a quantity of fuel injected, accelerator pedal position, etc., are fed back so that an actual quantity of power generated and an actual generator speed reach target values determined. How a final target power generation quantity $G_F$, a final target generator speed $Ng_F$, and engine permission and prohibition are determined will hereinafter be described in detail in a time series manner.

Figure 2:
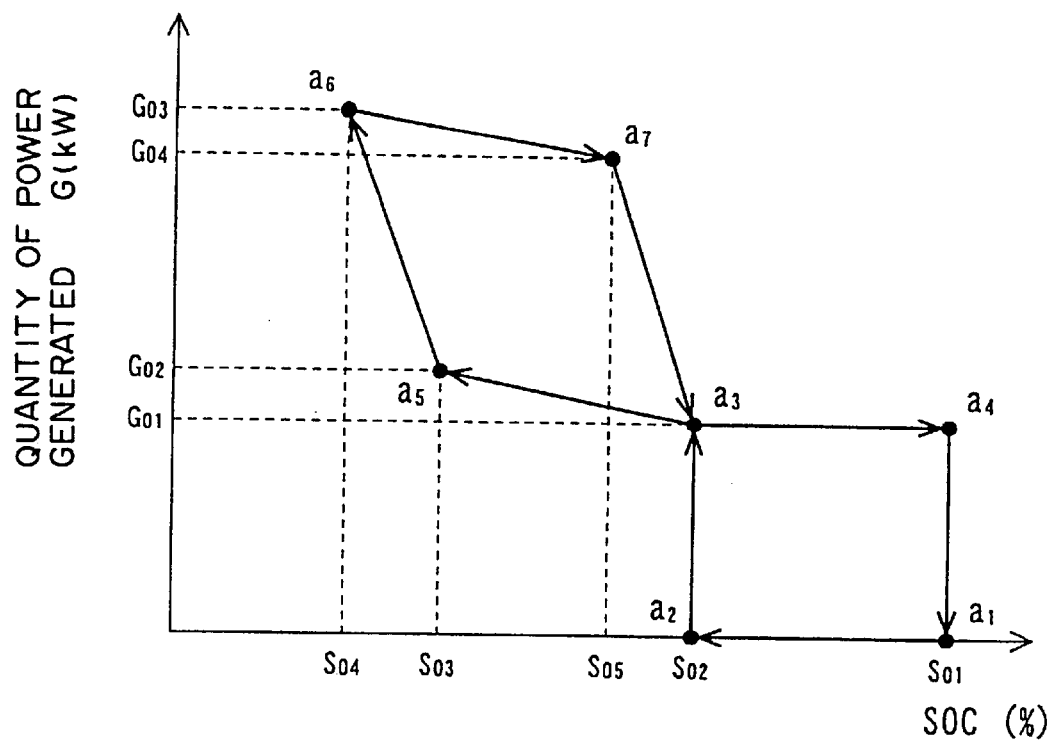
FIG. 2 is a graph used to explain the charged-level based power generation control in the engine operation controller for a hybrid electric automobile, constructed according to the preferred embodiment of the present invention.
Figure 3:
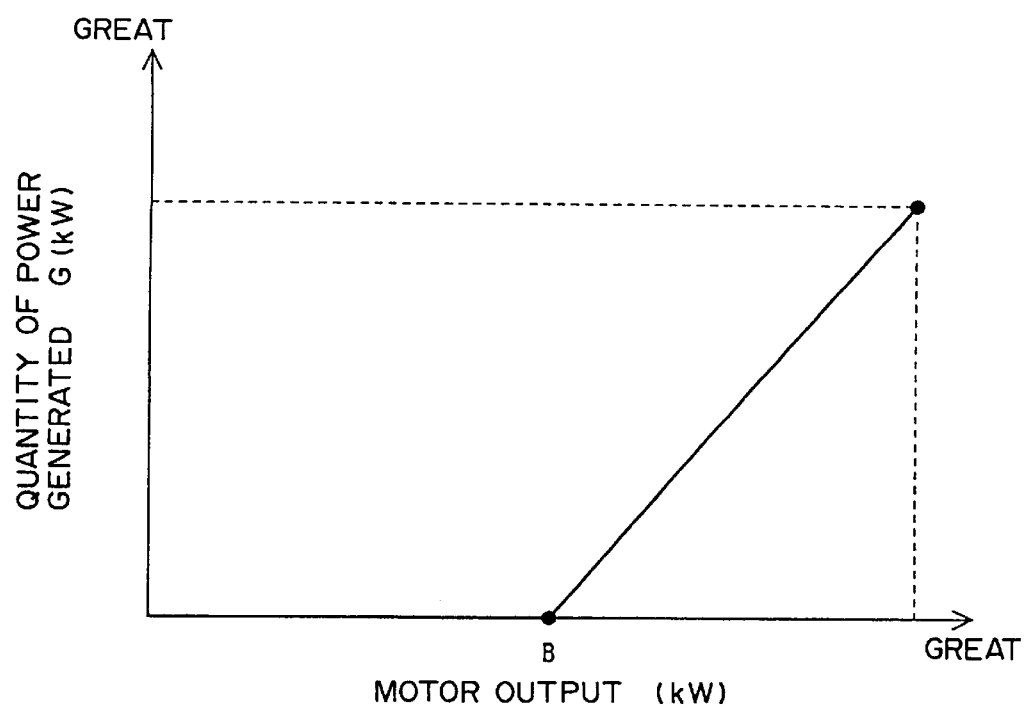
FIG. 3 is a graph used to explain the motor-output based power generation control in the engine operation controller for a hybrid electric automobile, constructed according to the preferred embodiment of the present invention.

Initially, if power generation control is started, the charged-level based power generation control shown in FIG. 2, and the motor-output based power generation control shown in FIG. 3, are performed. As shown in FIG. 2, when the battery charging rate (hereinafter referred to as SOC) becomes a predetermined first lower value $S_{02}\%$ (e.g., 40%) or less during normal operation, the generator 5 starts power generation and increases the SOC. When the SOC reaches a predetermined upper limit value $S_{01}\%$ (e.g., 45%), the generator 5 stops power generation.

In this manner, the SOC is held between the predetermined first lower value $S_{02}\%$ and the predetermined upper limit value $S_{01}\%$. More specifically, discharging is performed at point $a_1$ (SOC=$S_{01}\%$) in FIG. 2. When the SOC is reduced to point $a_2$ (SOC=$S_{02}\%$), the generator 5 starts power generation and increases the quantity of the generated power to point $a_3$ [$G_{01}$ kW (e.g., 40 kW), SOC=$S_{02}\%$]. When the SOC increases and then reaches point $a_4$ ($G_{01}$ kW, SOC=$S_{01}\%$), the generator 5 stops power generation.

Note that when load to the motor 3 becomes great due to an upward slope, etc. and, because of an increase in the quantity of power consumed, the SOC is temporarily reduced to less than the predetermined first lower value $S_{02}\%$, the quantity of power that is generated by the generator 5 is increased continuously from point $a_3$ ($G_{01}$ kW, SOC=$S_{02}\%$) up to point $a_5$ [$G_{02}$ kW (e.g., 45 kW), SOC=$S_{03}\%$ (e.g., 25%)] in accordance with the reduced level of the SOC. In addition, when high load to the motor 3 is continued due to an upward slope, etc., and the SOC becomes less than the second lower limit value $S_{03}\%$, the quantity of power that is generated by the generator 5 is further increased continuously from point $a_5$ ($G_{02}$ kW, SOC=$S_{03}\%$) up to point $a_6$ [$G_{03}$ kW (e.g., 100 kW), SOC=$S_{04}\%$ (e.g., 20%)] in accordance with the quantity of the reduced SOC. When the SOC reaches the third lower limit value $S_{04}\%$, the maximum power generation quantity $G_{03}$ kW is output.

Thereafter, according to an increase in the SOC, the generated power is gradually reduced in the order of point $a_6$ ($G_{03}$ kW, SOC=$S_{04}\%$)→point $a_7$ [$G_{04}$ kW (e.g., 80 kW), SOC=$S_{05}\%$ (e.g., 35%)]→point $a_3$ ($G_{01}$ kW, SOC=$S_{02}\%$).

In addition, as shown in FIG. 3, the generated power is controlled according to motor outputs in addition to the SOC. That is, when the motor output exceeds the maximum output B kW (e.g., 100 kW) of the battery 1, power generation by the generator 5 is started so that the generated power is increased according to an increase in the motor output. That is, until the motor output reaches the maximum output B kW of the battery 1, the motor output is supplied only by the battery 1. On the other hand, when the motor output exceeds the maximum output B kW of the battery 1, the maximum output of the battery 1 is supplied to the motor output and, in addition, the shortage is supplemented by the quantity of power generated by the generator 5.

The power determined in the charged-level based power generation control shown in FIG. 2 is compared with the power determined in the motor-output based power generation control shown in FIG. 3, and the greater of the two is regarded as a first target power generation quantity $G_1$. If the first target power generation quantity $G_1$ is determined, then power generation permission control is performed.

Figure 4:
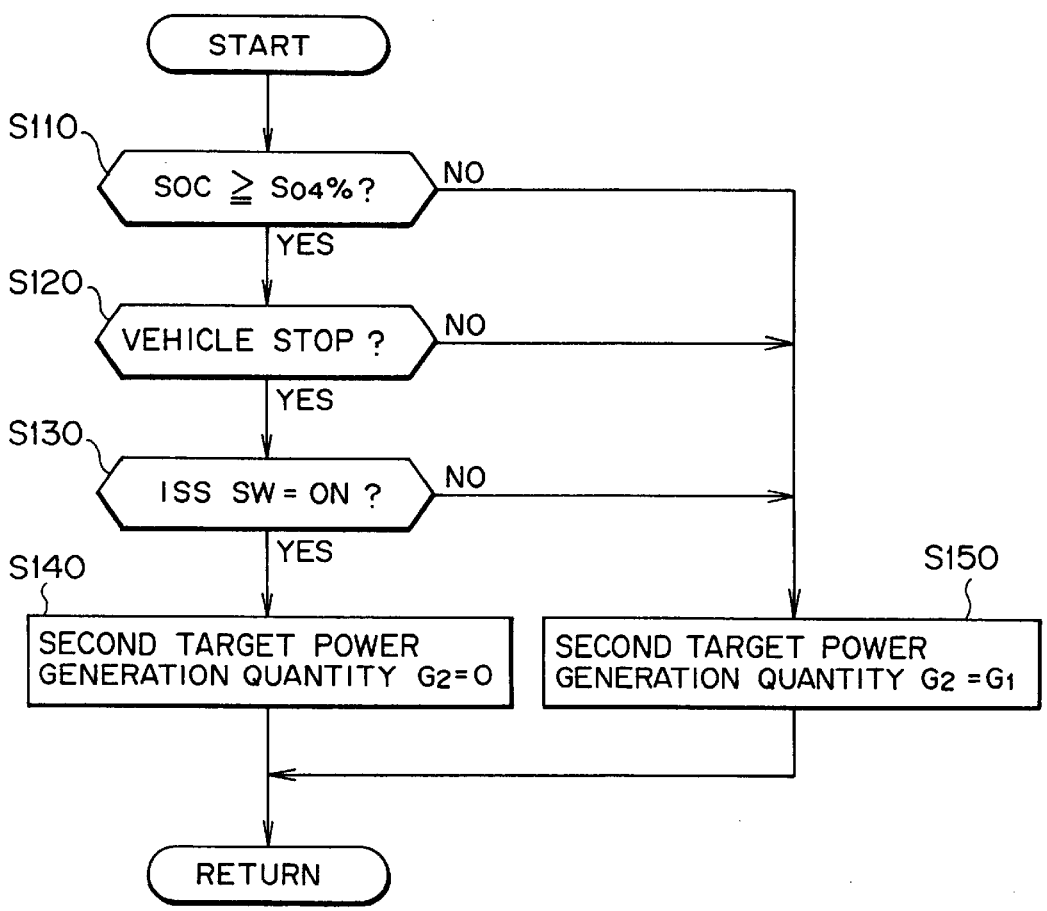
FIG. 4 is a flowchart used to explain the power generation permission control in the engine operation controller for a hybrid electric automobile, constructed according to the preferred embodiment of the present invention.

FIG. 4 shows how the power generation permission control is performed. The power generation permission control is the control of judging whether or not a power generation stop is permitted. Initially, in step S110 it is decided whether or not the SOC is the third lower limit value $S_{04}\%$ or greater. When it is decided that the SOC is less than $S_{04}\%$, it is decided that it is necessary to continue power generation to prevent the SOC from becoming less than $S_{04}\%$, and the control process advances to step S150. In step S150 the second target power generation quantity $G_2$ is set to the first target power generation quantity $G_1$, and the control process ends.

On the other hand, when it is decided that the SOC is $S_{04}\%$ or greater, in step S120 it is decided whether or not the vehicle is in the stopped state. The stopped state used herein includes a state near to a stop, and a reference value for the judgement is set for each vehicle. In the engine operation control of the present invention to be described in detail later, when the speed V of the vehicle is less than a first predetermined value ($V_1$), in step S120 it is decided that the vehicle is in the stopped state. Unless the determination of the operation of the generator is performed by the subsequent warming-up facilitation control, battery protection control, etc., operation of the engine 4 is stopped. The essential part of the control of the present invention, which is to be described later, is based on the assumption that when the speed V is less than the first predetermined value ($V_1$) and therefore in step S120 it is decided that the vehicle is in the stopped state, operation of the engine 4 is always stopped.

In step S120, when it is decided that the vehicle is not in the stopped state, that is, it is decided that power generation should not be stopped during traveling, the control process advances to step S150. In step S150 the second target power generation quantity $G_2$ is set to the first target power generation quantity $G_1$, and the control process ends. On the other hand, in step S120, when it is decided that the vehicle is in the stopped state, the control process advances to step S130.

In step S130 it is decided whether or not an ISS switch (not shown) is on. The ISS switch is the switch with which the driver can arbitrarily select whether or not an automatic stop of the engine 4 is performed. When the ISS is off, the control process advances to step S150 because the engine 4 cannot be stopped. In step S150 the second target power generation quantity $G_2$ is set to the first target power generation quantity $G_1$, and the control process ends. On the other hand, in step S130, when it is decided that the ISS switch is on, the control process advances to step S140. In step S140, the second target power generation quantity $G_2$ is set to 0 kW, and the control process ends. If the second target power generation quantity $G_2$ is determined in the aforementioned manner, warming-up facilitation control is subsequently performed.

Figure 5:
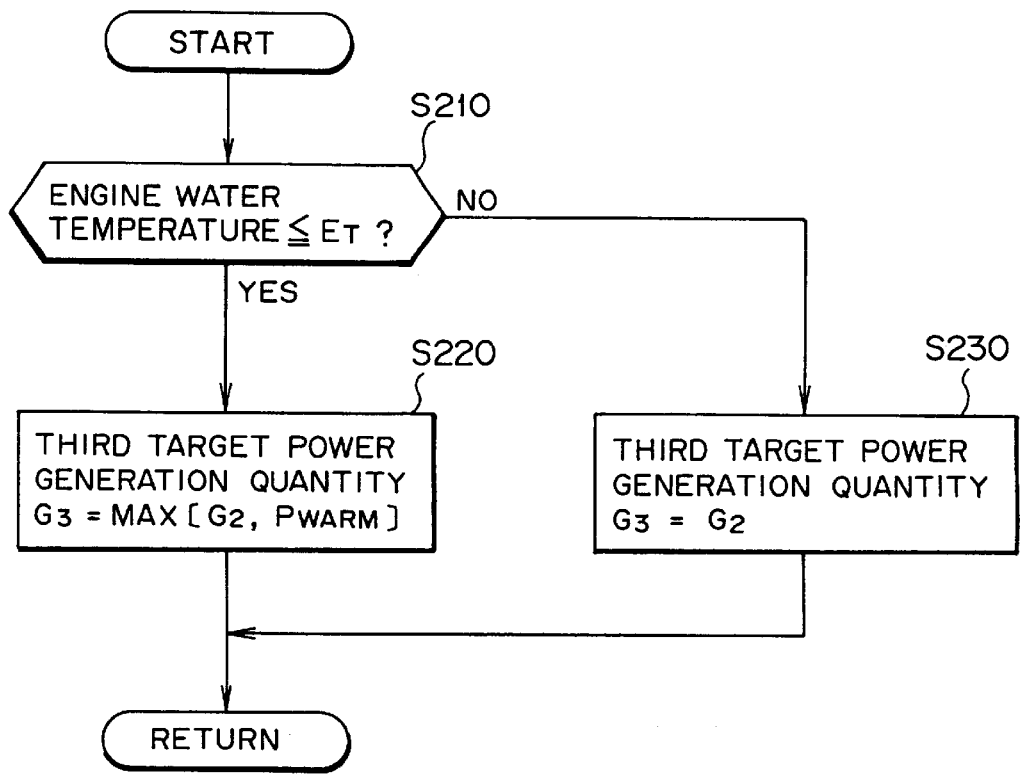
FIG. 5 is a flowchart used to explain the warming-up facilitation control in the engine operation controller for a hybrid electric automobile, constructed according to the preferred embodiment of the present invention.

FIG. 5 shows how the warming-up facilitation control is performed. The warming-up facilitation control is the control of continuing operation of the engine 4 to facilitate warming-up even when it is decided that power generation is not necessary, when warming-up is necessary.

Initially, in step S210, in order to judge whether or not warming-up is necessary, it is decided by the water temperature sensor 22 whether or not the temperature of the engine cooling water is less than a predetermined temperature $E_T$ (e.g., 60° C.). When it is decided that the engine cooling water temperature is the predetermined temperature $E_T$ or greater, it is decided that there is no need to perform warming-up, and the control process advances to step S230. In step S230, a third target power generation quantity $G_3$ is set to the second target power generation quantity $G_2$, and the control process ends. In this case, even when the second target power generation quantity $G_2$ is 0 kW, the third target power generation quantity $G_3$ is set to 0 kW. The engine 4 is stopped unless power generation is determined in the subsequent controls.

On the other hand, in step S210, when it is decided that the engine cooling water temperature is less than the predetermined temperature $E_T$, the control process advances to step S220. In step S220, the second target $G_2$ is compared with a predetermined warming-up power generation quantity $P_{WARM}$ (e.g., 10 kW), and the greater of the two is set to the third target power generation quantity $G_3$.

That is, when the engine cooling water temperature is lower than the predetermined temperature $E_T$, power is generated at least by the predetermined warming-up power generation quantity $P_{WARM}$ to apply load to the engine 4, even in the case where it is determined in the aforementioned power generation permission control that the second target power generation quantity $G_2$ is 0 kW. In this manner, warming-up is facilitated. The predetermined warming-up power generation quantity $P_{WARM}$ is set to an appropriate value to the degree that warming-up of the engine 4 can be facilitated. If the third target power generation quantity $G_3$ is determined, regenerative power generation control is subsequently performed.

Figure 6:
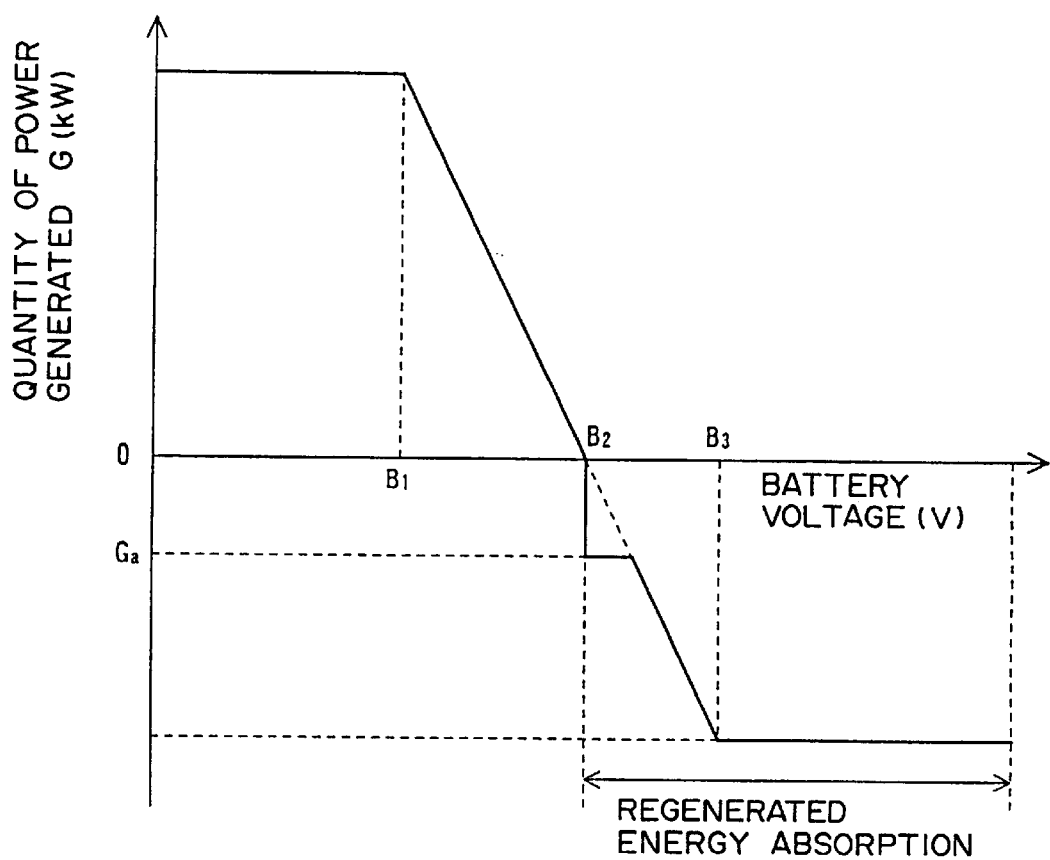
FIG. 6 is a graph used to explain the regenerative power generation control in the engine operation controller for a hybrid electric automobile, constructed according to the preferred embodiment of the present invention.

FIG. 6 shows how the regenerative power generation control is performed. The regenerative power generation control is the control of changing the quantity of generated power according to battery voltage and positively charging the battery 1 with regenerated power. That is, since there is a limit to the quantity of power with which the battery 1 is charged, the quantity of power that is generated by the generator 5 is reduced when the voltage across battery 1 becomes a fixed value or greater, and the battery 1 is preferentially charged with regenerated energy by the quantity of power reduced. In this manner, wasteful power generation can be prevented and the energy efficiency can be enhanced.

More specifically, in FIG. 6, when the voltage across the battery 1 is a first battery voltage $B_1$ or greater, the quantity of power that is generated by the generator 5 is reduced according to an increase in the battery voltage. When the battery voltage is increased up to a second battery voltage $B_2$, the quantity of power that is generated by the generator 5 is reduced to 0 kW.

Furthermore, when the battery voltage is increased beyond the second battery voltage $B_2$, regenerated energy is supplied to the engine 4 to drive the engine 4 (in FIG. 6, a range of less than 0 kw). In this manner, regenerative braking is gradually released without being sharply released, and action of the engine brake is assured. Note in FIG. 6 that when the battery voltage becomes greater than the second battery voltage $B_2$ and therefore the engine is driven with regenerated energy, at least a fixed quantity of power $G_a$ is supplied to the engine.

With this construction, the vibration that develops when the engine 4 is driven at low speed is suppressed. As described above, a fourth target power generation quantity $G_4$ is determined according to the battery voltage. If the fourth target power generation quantity $G_4$ is determined, battery protection control is subsequently performed.

Figure 7:
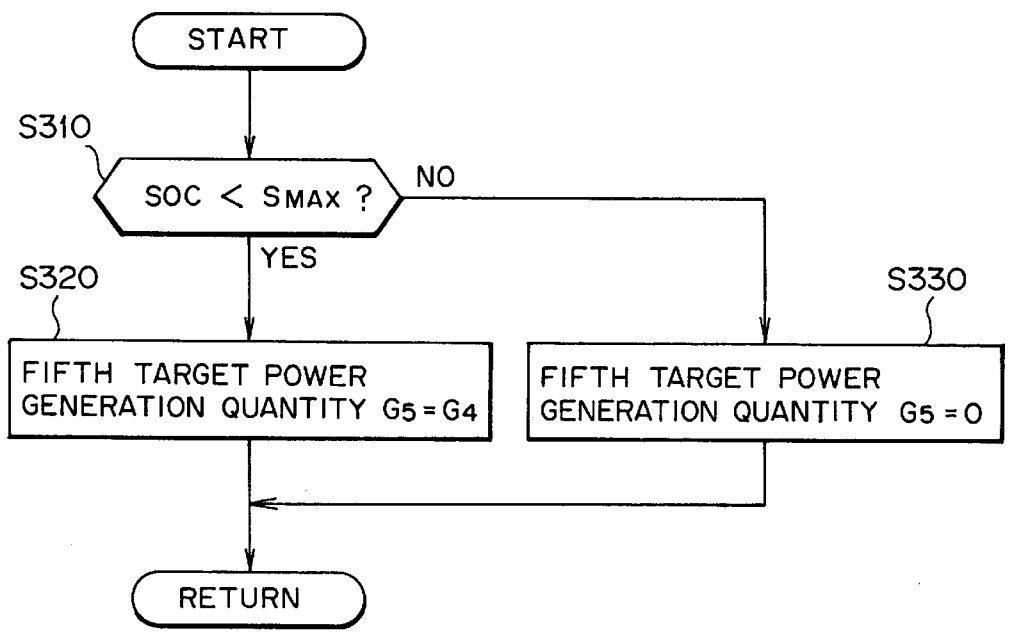
FIG. 7 is a flowchart used to explain the battery protection control in the engine operation controller for a hybrid electric automobile, constructed according to the preferred embodiment of the present invention.

FIG. 7 shows how the battery protection control is performed. The battery protection control is the control of preventing damage to the battery by stopping power generation when the SOC becomes greater than $S_{MAX}$ (e.g., 65%) which is the maximum SOC. The $S_{MAX}$ refers to the maximum battery charging rate that can prevent damage to the battery 11 when overcharging is repeated. The $S_{MAX}$ is individually determined according to the performance of the battery 1.

Initially, in step S310 the current SOC is compared with the maximum SOC ($S_{MAX}$). When it is decided that the current SOC is greater than $S_{MAX}$, it is decided that further charging is not necessary, and the control process advances to step S330. In step S330a fifth target power generation quantity $G_5$ is set to 0 kW, and the control process ends. In the case where the current SOC is greater than $S_{MAX}$, power generation by regeneration is prohibited, whereby the battery 1 is prevented from being charged. On the other hand, in step S310, when it is decided that the current SOC has not reached $S_{MAX}$, the fifth target power generation quantity $G_5$ is set to the fourth target power generation quantity $G_4$, and the control process ends. If the fifth target power generation quantity $G_5$ is determined, generator speed determination control is subsequently performed.

Figure 8:
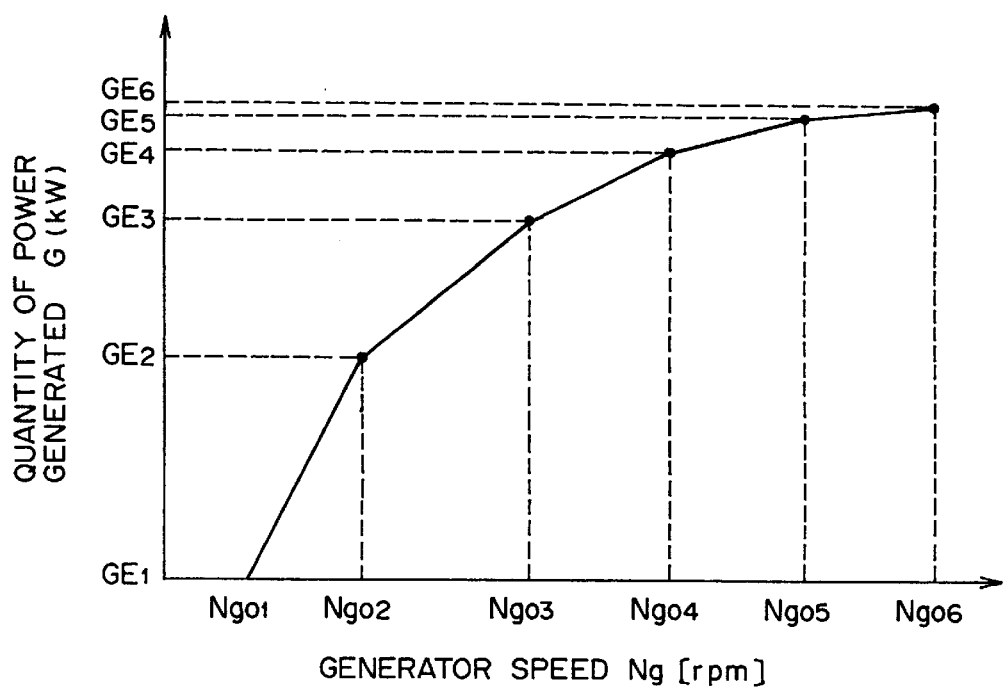
FIG. 8 is a graph used to explain the generator speed determination control in the engine operation controller for a hybrid electric automobile, constructed according to the preferred embodiment of the present invention.

FIG. 8 shows how the generator speed determination control is performed. The generator speed determination control is the control of determining the speed of the generator 5 required for obtaining the aforementioned fifth target power generation quantity $G_5$, by a plot of the generated powers GE as a function of generator speed Ng (see FIG. 8). This plot represents the relationship between the power generation quantity and the generator speed, obtained when the engine 4 is most efficiently driven within a generator speed rating region specified so that the temperature of the generator 5 does not exceed its upper limit value. For instance, in FIG. 8, when the engine 4 is most efficiently driven to obtain a power generation quantity $GE_2$, the generator speed is $N_{g02}$. If a first target generator speed $N_{g1}$ corresponding to the fifth target power generation quantity $G_5$ is determined by the generator speed determination control, engine stop permission control is subsequently performed.

Figure 9:
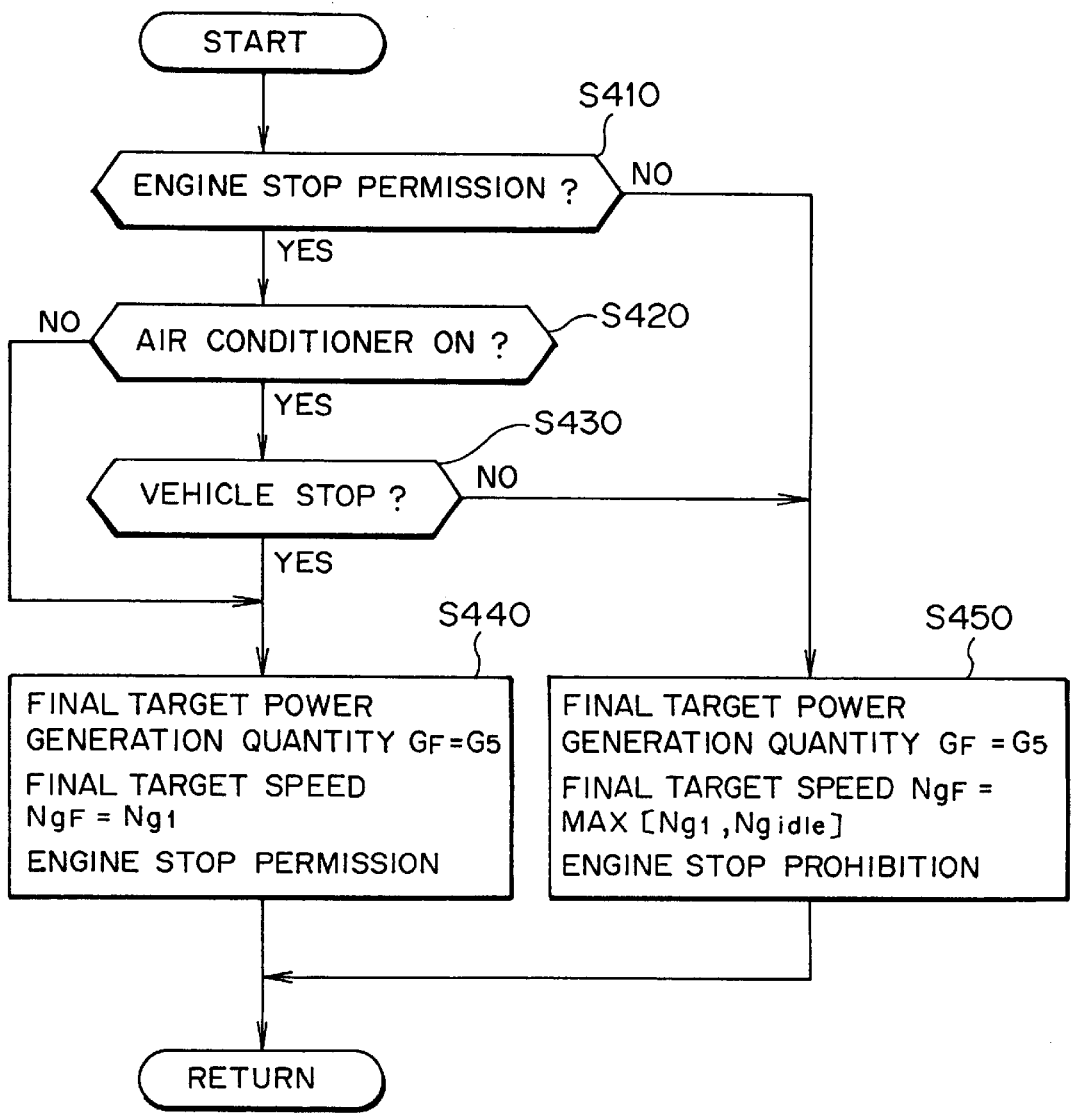
FIG. 9 is a flowchart used to explain the engine stop permission control in the engine operation controller for a hybrid electric automobile, constructed according to the preferred embodiment of the present invention.

FIG. 9 shows how the engine stop permission control is performed. The engine stop permission control is the control of determining whether or not the stop of the engine 4 is permitted.

Initially, in step S410, various conditions for permitting the stop of the engine 4 are decided. For instance, it is decided whether or not the seat belt has been fastened, and it is decided whether or not the trunk lid is open. Whether or not the seat belt has been fastened, and whether or not the trunk lid is open, are detected with corresponding sensors.

When the seat belt has not been fastened, or when the trunk lid is open, the control process advances to step S450. In step S450 the stop of the engine is prohibited. When the seat belt has not been fastened, it is assumed that a driver is away from the driver's seat. When the trunk lid is open, it is assumed that a worker is conducting operations with the trunk lid open. In these cases, operation of the engine 4 is continued by prohibiting the stop of the engine 4.

With this construction, when a driver is away from the driver's seat, or when a worker is conducting operations, the driver or work can be prevented from mistaking, by automatic engine stop, that the engine key has been turned off. Thus, safety is enhanced.

On the other hand, when all conditions in step S410 are satisfied, the control process advances to step S420, in which it is decided whether or not the air conditioner is on. When it is decided that the air conditioner is on, the control process advances to step S430, in which it is decided that the vehicle is at a stop. On the other hand, when it is decided that the air conditioner is off, the control process advances to step S440 without deciding whether or not the vehicle is at a stop. In step S440, a stop of the vehicle is permitted.

In step S420, when it is decided that the air conditioner is on, the control process advances to step S430, as described above. In step S430 it is decided whether or not the vehicle is at a stop. When the vehicle is not at a stop, the air conditioner will be stopped if the engine 4 is stopped. Therefore, the control process advances to step S450, in which the stop of the engine 4 is prohibited. On the other hand, in step S430, when it is decided that the vehicle is at a stop, the stillness during the stop of the vehicle has priority over operation of the air conditioner, and the control process advances to step S440, in which the stop of the engine is permitted.

When the control process advances to step S440, the final target power generation quantity $G_F$ is set to the fifth target power generation quantity $G_5$ and the final target generator speed $Ng_F$ to the first target generator speed $Ng_1$, and an engine stop is permitted and the control process ends. When the control process advances to step S450, the final target power generation quantity $G_F$ is set to the fifth target power generation quantity $G_5$, and the final target generator speed $Ng_F$ is set to either the first target generator speed $Ng_1$ or idling speed $N_{idle}$, which is the greater of the two. With an engine stop prohibited, the control process ends.

If the final target power generation quantity $G_F$, the final target generator speed $Ng_F$, and the engine stop permission or prohibition are determined, command signals are output from the control 6 to the engine 4, the generator 6, etc., and a quantity of fuel injected, accelerator pedal position, a quantity of power generated, etc., are fed back. In step S440, when an engine stop is permitted, and the final target power generation quantity $G_F$ is 0 kW, the engine 4 is stopped. On the other hand, when an engine stop is permitted, and the final target power generation quantity $G_F$ is not 0 kW, operation of the engine 4 is continued to obtain the final target power generation quantity $G_F$. In addition, in step S450, even in the case where the final target power generation quantity $G_F$ is 0 kW, the engine 4 is operated at least at an idling engine speed, when an engine stop is prohibited.

The sequence of power generation controls from the charged-level based power generation control to the engine stop permission control, described above, is executed in fixed control cycles, and the final target power generation quantity, etc., are determined for each cycle.

Next, a description will be given of the essential part of the present invention. The controller 6 is provided with prohibition means (not shown) which prohibits operation of the engine 4 immediately before the vehicle stops. The controller 6 is also provided with decision means (not shown). The decision means decides, based on information from the door switch 31, whether the vehicle (in the preferred embodiment, a route bus) is standing at a bus stop, or standing at a traffic signal (including a railroad crossing, etc.). The controller 6 is further provided with delay means (not shown) which, when it is decided by the decision means that a stop of the vehicle is a stop at a bus stop, delays removal of the operation prohibition of the engine 4 beyond the stoppage time at a traffic signal.

Therefore, immediately before the vehicle stops, operation of the engine 4 is prohibited by the prohibition means, and the condition of permitting restarting of the engine 4 is changed according to the decision result of the decision means based on information from the door switch 31.

Figure 10:
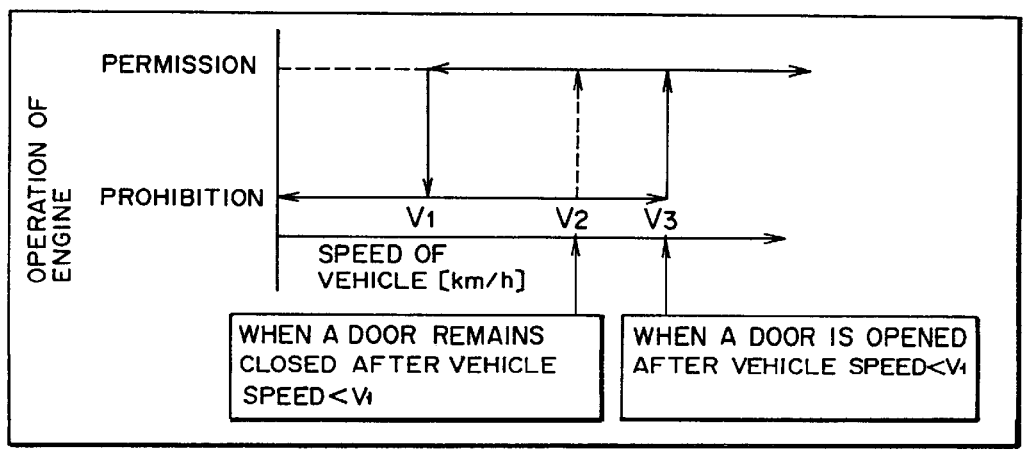
FIG. 10 is a graph used to explain the operation characteristic of the engine operation controller for a hybrid electric automobile, constructed according to the preferred embodiment of the present invention.

In the preferred embodiment, two parameters, consisting of speed and time, are used to change the condition of permitting restarting of the engine 4. The speed parameter is set as shown in FIG. 10. That is, in the controller 6, when it is decided, based on information detected by the speed sensor 30, that the speed of vehicle is less than a first predetermined value $V_1$ (e.g., 5 Km/h), operation of the engine 4 is prohibited if it is in the aforementioned engine stop permitting state. Therefore, if the engine 4 is being operated, it will be stopped if the speed of the vehicle becomes less than the first predetermined value $V_1$ (idling stop).

When the speed of the vehicle is less than the predetermined value $V_1$, and an open or closed state of the door is not detected, it is decided that the vehicle is standing at a traffic signal, and as shown in FIG. 10, operation of the engine 4 is prohibited until the speed of the vehicle reaches a second predetermined value $V_2$ (e.g., 10 Km/h). On the other hand, when the speed of the vehicle is less than the predetermined value $V_1$, and an open or closed state of the door is detected, it is decided that the vehicle is standing at a bus stop, and operation of the engine 4 is prohibited until the speed of the vehicle reaches a third predetermined value $V_3$ (e.g., 20 Km/h) greater than the second predetermined value $V_2$.

In this manner, when the vehicle is standing at a traffic signal, operation of the engine 4 is permitted at a relatively low speed $V_2$. Therefore, restarting of the engine 4 is performed quickly after the vehicle is started, and a reduction in the amount of charge in the battery 1 is prevented. When the speed of the vehicle is less than the first predetermined value $V_1$, and an open or closed state of the door is detected, it is decided that the vehicle is standing at a bus stop, and restarting of the engine 4 is not permitted unless the speed of the vehicle reaches the third predetermined value $V_3$ greater than the second predetermined value $V_2$. Therefore, the engine 4 is restarted when the vehicle is away enough from a bus stop. As a result, there is no possibility that passengers at a bus stop will be displeased with exhaust gas, and in addition, there is no possibility that passengers will be frightened with sudden engine-starting noise.

As described above, in addition to the condition related to speed, the condition related to time is used as the condition of permitting operation of the engine 4. More specifically, when the speed of the vehicle becomes less than the speed $V_1$ and operation of the engine 4 is prohibited, and then an open or closed state of the door is not detected, the operation prohibition of the engine 4 is held until a first predetermined time $\Delta t_2$ elapses since the speed of the vehicle became the speed $V_1$. When an open or closed state of the door is detected, the operation prohibition of the engine 4 is held until a second predetermined time $\Delta t_3$ ($\geq \Delta t_2$) elapses since the speed of the vehicle became speed $V_1$.

Figure 11A:
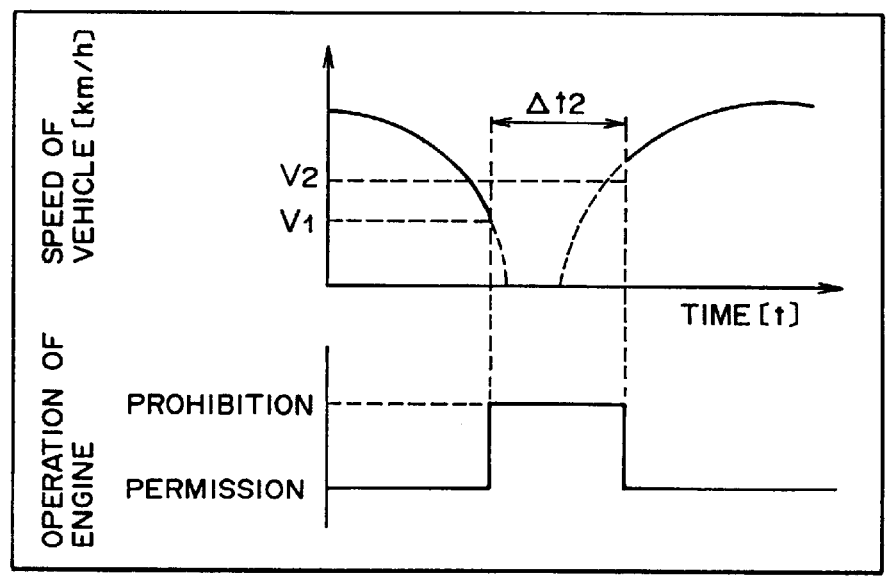
FIG. 11A is a graph used to explain the operation characteristic of the engine operation controller for a hybrid electric automobile, constructed according to the preferred embodiment of the present invention.
Figure 11B:
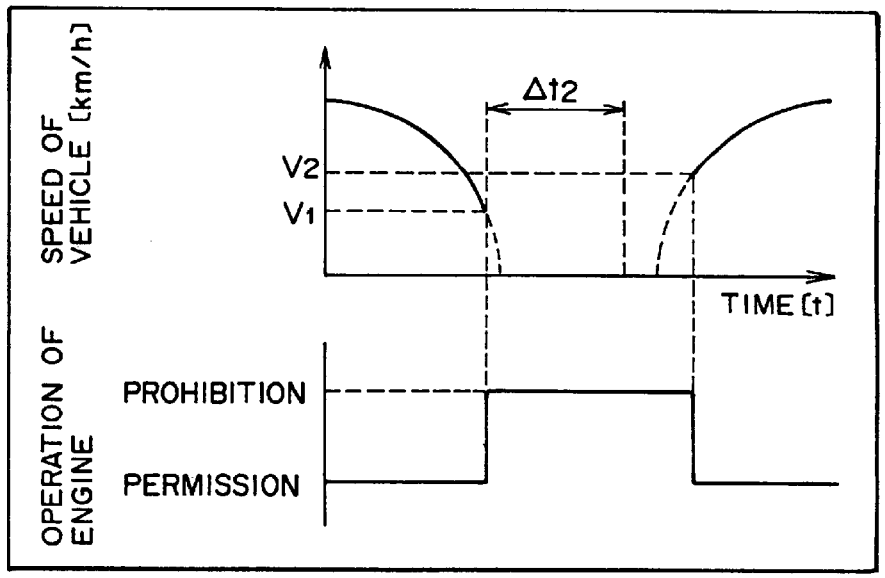
FIG. 11B is a graph used to explain the operation characteristic of the engine operation controller for a hybrid electric automobile, constructed according to the preferred embodiment of the present invention.

These conditions are shown in FIGS. 11A and 11B and FIGS. 12A and 12B. That is, if the speed of the vehicle becomes less than $V_1$, operation of the engine 3 is first prohibited. Thereafter, when an open or closed state of the door is not detected, the operation prohibition of the engine 4 is held until the first predetermined time $\Delta t_2$ elapses since operation of the engine 4 was prohibited, even when the speed of the vehicle becomes greater than the predetermined value $V_2$, as shown in FIG. 11A. Conversely, as shown in FIG. 11B, even when the speed of the vehicle becomes less than $V_1$, and the predetermined time $\Delta t_2$ elapses since operation of the engine 4 was prohibited, the operation prohibition of the engine 4 is held until the speed of the vehicle reaches the predetermined value $V_2$.

Figure 12A:
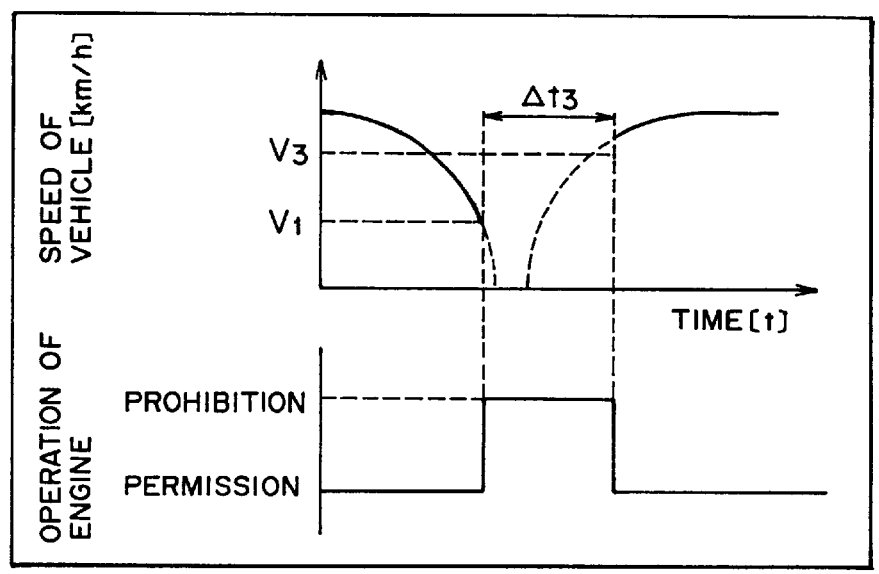
FIG. 12A is a graph used to explain the operation characteristic of the engine operation controller for a hybrid electric automobile, constructed according to the preferred embodiment of the present invention.
Figure 12B:
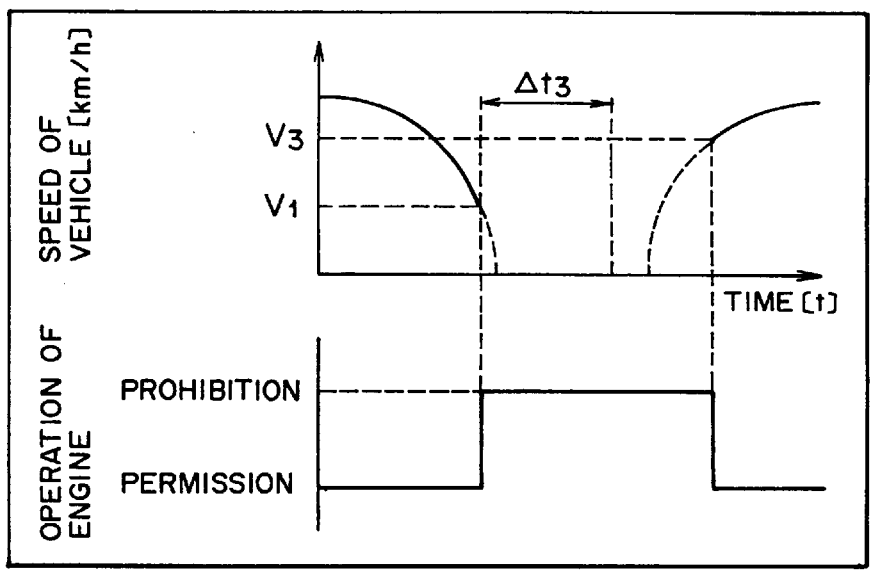
FIG. 12B is a graph used to explain the operation characteristic of the engine operation controller for a hybrid electric automobile, constructed according to the preferred embodiment of the present invention.

When an open or closed state of the door is detected, similar control is executed. That is, as shown in FIG. 12A, even when the speed of the vehicle becomes less than $V_1$ and operation of the engine 4 is prohibited, and then the speed of the vehicle becomes a predetermined value $V_3$ ($\geq V_2$) or greater, the operation prohibition of the engine is held until a predetermined time $\Delta t_3$ ($\geq \Delta t_2$) elapses since the operation prohibition of the engine 4. In addition, as shown in FIG. 12B, even when the speed of the vehicle becomes less than $V_1$ and operation of the engine 4 is prohibited, and then the predetermined time $\Delta t_3$ elapses, the operation prohibition of the engine 4 is held until the speed of the vehicle reaches the predetermined value $V_3$.

Now, a description will be given of the predetermined times $\Delta t_2$, $\Delta t_3$. The first predetermined time $\Delta t_2$ is set to a time that can prevent the repetition (hunting) of the stop and restarting of the engine 4 which is caused by a traffic snarl, etc. In this manner, the preferred embodiment can prevent the repetition (hunting) of the stop and restarting of the engine 4 when the speed of the vehicle becomes equal to or greater than the second predetermined value $V_2$ immediately after the speed becomes less than the first predetermined value $V_1$, because of a traffic snarl, etc.

The first predetermined time $\Delta t_2$ is also set to a relatively short time, compared with the second predetermined time $\Delta t_3$ that is to be described later. Therefore, when the vehicle is stopped at a traffic signal, etc., restarting of the engine 4 is permitted at relatively short timing (timing at which the vehicle reaches the predetermined time $\Delta t_2$ after it is started) and therefore a reduction in the quantity of charge in the battery 1 is prevented.

The second predetermined time $\Delta t_3$ is set to an average time needed for the vehicle to start after the passengers get on and off at a bus stop. In this manner, the engine 4 is prevented from being restarted at a bus stop immediately after the vehicle is started. Therefore, the preferred embodiment can avoid the situation in which passengers at a bus stop are exposed to exhaust gas and are frightened by sudden engine-starting noise.

Next, a description will be given of the second and third predetermined speeds $V_2$ and $V_3$ that permit restarting of the engine 4. The second predetermined speed $V_2$ is provided for prohibiting restarting of the engine 4 until the vehicle is started, even when the vehicle is standing at a traffic signal, etc. for a period greater than the predetermined time $\Delta t_2$. For this reason, the second predetermined speed $V_2$ is set to a relatively low value (e.g., 10 Km/h). By setting the second predetermined speed $V_2$ in this manner, the idle stop state of the engine 4 (in which the engine 4 is stopped) is held during the stop of the vehicle at a traffic signal, etc., until the vehicle is started with reliability.

The third predetermined speed $V_3$ is provided for prohibiting restarting of the engine 4 even when the predetermined $\Delta t_3$ elapses while passengers are getting on and off at a bus stop, and is set to a speed (e.g., 20 Km/h) that is obtained when the vehicle is away enough from a bus stop. By setting the third predetermined speed $V_3$, the engine 4 can be prevented from being restarted at a bus stop during a stop of the vehicle. In this way, the preferred embodiment can reliably avoid the situation in which passengers are exposed to exhaust gas and are frightened by sudden engine-starting noise.

Even when operation of the engine 4 is being prohibited, the engine 4 is forcibly restarted in the following urgent cases in order to protect the battery 1:

(1) When it is detected by the pressure sensor (not shown) that the air pressure in the brake is a predetermined value or less. The reason for this is that in large vehicles such as a route bus, etc., pressurized air is employed as the working fluid for the brake. Therefore, if the air pressure is reduced, the compressor is driven to increase the air pressure by the engine 4.

(2) When it is detected by the specific gravity meter 10 that the specific gravity of the battery 1 or 1a becomes a very low capacity (e.g., 20% or less). This is for the purpose of protecting the battery 1a.

(3) When it is detected by the water temperature sensor 22 that the temperature of the cooling water is a predetermined temperature or greater. The reason for this is that since the engine 4 tends to be overheated, it is necessary to supply wind to the radiator by rotating the fan with the engine 4.

(4) When the engine room is opened. In this case, in consideration of safety the engine 4 is started when the engine room is about to open. Therefore, the preferred embodiment can avoid the situation where, under a mistake of the engine stop made by turning off the engine key, operations are started.

In addition, when the engine room is opened for inspection, it is preferable that the operating state of the engine be visually inspected. The stopped state of the engine 4 can be inspected only by turning off the engine key. From such a viewpoint, the engine 4 is operated when the engine room is open.

Figure 13:
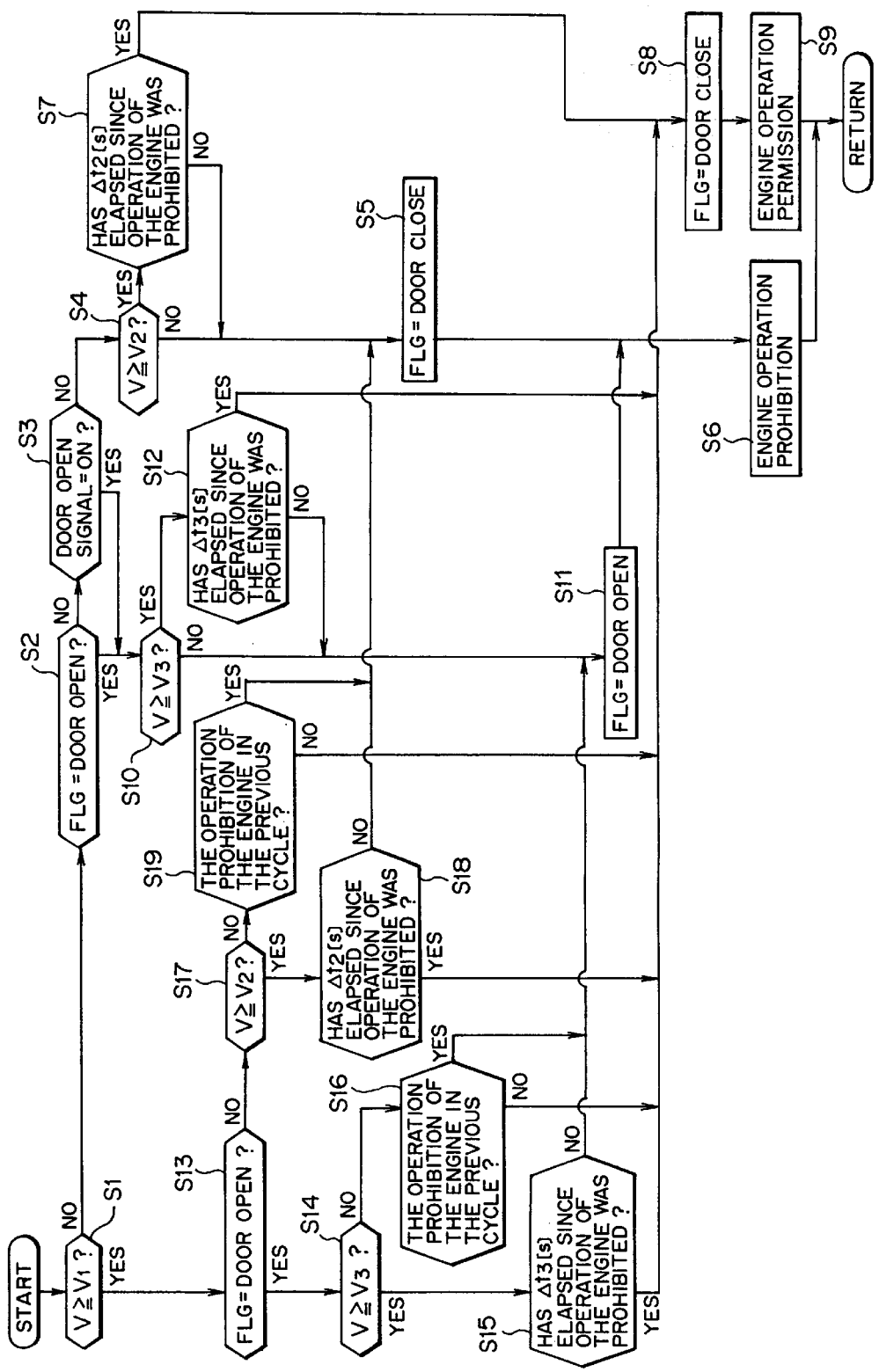
FIG. 13 is a flowchart used to explain the operation of the engine operation controller for a hybrid electric automobile, constructed according to the preferred embodiment of the present invention.

The engine operation controller for a hybrid electric automobile according to the preferred embodiment of the present invention is operated according to a flowchart such as that shown in FIG. 13, because it is constructed as described above.

In step S1, it is first decided whether or not the speed V of the vehicle is $V_1$ or greater. If the speed V is less than $V_1$, the process advances to step S2, in which it is decided whether or not the flag is "Door Open." Note that the flag in the first control cycle has been set to "Door Closed." Therefore, the process advances to step S3 through the route of "NO."

In step S3, information from the door switch is taken in, and it is decided whether or not the door is opened. If the door has been closed, the process advances to step S4. On the other hand, if the door is open, the process advances to step S10. In the case where the door has been closed, in step S4 it is decided, based on the information from the speed sensor 30, whether or not the speed V is a predetermined speed $V_2$ or greater. When it is less than $V_2$, the process advances to step S5, in which the flag is set to "Door Closed." After that, in step S6 operation of the engine 4 is prohibited.

When the speed V is $V_2$ or greater, the process advances from step S4 to step S7, in which it is decided whether or not the predetermined time $\Delta t_2$ has elapsed since operation of the engine 4 was prohibited. If the predetermined time $\Delta t_2$ has elapsed, the process advances to step S8, in which the flag is set to "Door Closed." After that, the process advances to step S9, in which operation of the engine 4 is permitted. If, in step S7, it is decided that the predetermined time $\Delta t_2$ has not elapsed, the process advances to step S5 and to step S6, in which operation of the engine 4 is prohibited.

On the other hand, when in step S2 it is decided that the flag is "Door Open," or when in step S3 it is decided that the door is opened, the process advances to step S10, in which it is decided whether or not the speed V is the predetermined speed $V_3$ or greater. When it is less than $V_3$, the process advances to step S11, in which the flag is set to "Door Open." After that, in step S6 operation of the engine 4 is prohibited.

If, in step S10, it is decided that the speed V is $V_3$ or greater, the process advances to step S12. In step S12 it is decided whether or not the predetermined time $\Delta t_3$ has elapsed since the previous prohibition of the operation of the engine 4. If the predetermined time $\Delta t_3$ has elapsed, the process advances from step S12 to step S8, in which the flag is set to "Door Closed." Thereafter, in step S9, operation of the engine 4 is permitted. If, in step S12, it is decided that the predetermined time $\Delta t_3$ has not elapsed, the process advances to step S11 and to step S6, in which operation of the engine 4 is prohibited.

On the other hand, when in step S1 it is decided that the speed V is the predetermined speed $V_1$ or greater, the process advances to step S13 and steps thereafter. In step S13 it is decided whether or not the flag is "Door Closed." If the flag is "Door Open," the process advances to step S14, in which it is decided whether or not the speed V is the predetermined speed $V_3$ or greater. If it is $V_3$ or greater, the process advances to step S15, in which it is decided whether or not the predetermined time $\Delta t_3$ has elapsed since operation of the engine 4 was prohibited. If the predetermined time $\Delta t_3$ has elapsed, the process advances to step S8, in which the flag is set to "Door Closed." Thereafter, in step S9, operation of the engine 4 is permitted.

If, in step S14, it is decided that the speed V is less than the predetermined speed $V_3$, the process advances to step S16, in which it is decided whether or not operation of the engine 4 has been prohibited in the previous control cycle. If the operation of the engine 4 has been prohibited in the previous control cycle, in step S11 the flag is set to "Door Open." Therefore, in step S6 the operation of the engine 4 is prohibited. If, in step S16, it is decided that the operation of the engine 4 has been permitted in the previous control cycle, in step S8 the flag is set to "Door Closed." Thereafter, in step S9 the operation of the engine 4 is permitted.

When, in step S13, the flag is not "Door Open," the process advances to step S17 and steps thereafter, and the same control as step S14 and steps thereafter is executed. That is, in step S17 it is decided whether or not the speed V is the predetermined speed $V_2$ or greater. If it is the predetermined speed $V_2$ or greater, in step S18 it is decided whether or not the predetermined time $\Delta t_2$ has elapsed since operation of the engine 4 was prohibited. If the predetermined time $\Delta t_2$ has elapsed, the process advances to step S8, in which the flag is set to "Door Closed." Thereafter, in step S9, operation of the engine 4 is permitted.

If, in step S17, it is decided that the speed V is less than the predetermined speed $V_2$, the process advances to step S19, in which it is decided whether or not operation of the engine 4 has been prohibited in the previous control cycle. If operation of the engine 4 has been prohibited in the previous control cycle, in step S5 the flag is set to "Door Open." Therefore, in step S6, operation of the engine 4 is prohibited. If, in step S19, it is decided that operation of the engine 4 has been permitted in the previous control cycle, in step S8 the flag is set to "Door Closed." Thereafter, in step S9, operation of the engine 4 is permitted.

Thus, according to the engine operation controller for a hybrid electric automobile of the preferred embodiment of the present invention, operation of the engine is prohibited immediately before the vehicle is stopped (less than the speed $V_1$). Therefore, there is an advantage that an idling stop can be reliably executed when the vehicle is stopped. In addition, when an open or closed state of the door is not detected during the stop of the vehicle, it is assumed that the vehicle is standing at a traffic signal. Then, if the condition that the predetermined time $\Delta t_2$ (suitable for preventing the hunting of the engine) has elapsed, and the condition that the speed of the vehicle is the relatively low speed $V_2$ or greater, are satisfied, restarting of the engine 4 is permitted and therefore the engine 4 can be restarted at relatively short timing after the vehicle is started. As a result, the idling stop can be executed, while a reduction in the amount of charge in the battery 1 is being prevented.

In addition, by setting the first predetermined time $\Delta t_2$, the preferred embodiment of the present invention can reliably prevent the repetition (hunting) of the operation and stop of the engine 4 when the speed of the vehicle reaches the second predetermined value $V_2$ immediately after the speed becomes less than the first predetermined value $V_1$, because of a traffic snarl, etc.

When an open or closed state of the door is detected during a stop of the vehicle, it is assumed that the vehicle is standing at a bus stop. Then, if the condition that the predetermined time $\Delta t_3$ has elapsed, and the condition that the speed of the vehicle is the predetermined speed $V_3$ or greater, are satisfied, restarting of the engine 4 is permitted. Therefore, the engine 4 can be prevented from being restarted at a bus stop during a stop of the vehicle. Thus, the preferred embodiment of the present invention can avoid the situation where passengers are exposed to exhaust gas and also are frightened by sudden engine-starting noise. In addition, even when the predetermined time $\Delta t_3$ has elapsed, restarting of the engine 4 is prohibited until the speed of the vehicle reaches the third predetermined speed $V_3$. Therefore, even if it takes time to get on and off, the preferred embodiment can reliably avoid the situation in which passengers are exposed to exhaust gas and are frightened by sudden engine-starting noise.

In the preferred embodiment, whether or not the vehicle is standing at a bus stop is decided by employing the door switch which detects an open or closed state of the door, and when it is detected that the door is opened, it is decided that the vehicle is standing at a bus stop. However, the present invention is not limited to the preferred embodiment. By detecting action of a knee ring device, or by detecting blinking of a step lamp, it may be decided that the vehicle is standing at a bus stop. In addition, in the case where vehicles travel on the left side, it may be decided that the vehicle has stopped at a bus stop, when it is detected that the right winker lamp has been blinked within a predetermined time after blinking of the left winker lamp.

By photographing the side of the vehicle with camera means and then displaying an image acquired by the camera means, it may be decided whether or not a stop of the vehicle is a stop at a bus stop. By installing a transmitter in a bus stop and a receiver in the vehicle and then receiving a signal transmitted from the transmitter with the receiver, a stop at a bus stop may be decided.

In the preferred embodiment, when it is decided that a stop of the vehicle is a stop at a bus stop, the speed of the vehicle at which the operation prohibition of the engine is removed is set great compared with the case where the vehicle is stopped at a traffic signal, etc. In addition, the time between the operation prohibition of the engine and the removal of the prohibition is set long. However, the present invention is not limited to the preferred embodiment. When it is decided that a stop of the vehicle is a stop at a bus stop, only the speed of the vehicle at which the operation prohibition of the engine is removed may be set great compared with the case where the vehicle is stopped at a traffic signal, etc. In addition, only the time between the operation prohibition of the engine and the removal of the operation prohibition may be set long.

In the preferred embodiment, operation of the engine is stopped immediately before the vehicle is stopped. However, when a speed of 0 is detected, that is, when the vehicle is stopped, operation of the engine may be prohibited. In the preferred embodiment, the operation prohibition of the engine is used as the condition of starting measurement, and the operation prohibition of the engine is removed when a predetermined time elapses since operation of the engine was prohibited. However, the present invention is not limited to this. The time when a speed of 0 is detected may be employed as the condition of starting measurement, and the time when the vehicle travels from a speed of 0 may be employed.

The preferred embodiment has been described with reference to the case where the engine operation control of the present invention is applied to a series hybrid electric automobile. However, the present invention is applicable other hybrid electric automobiles such as a parallel type. While the preferred embodiment has been described with reference to the case where the present invention is applied to this, the present invention is not to be limited to route buses. Even when the present invention is applied to other hybrid electric automobiles that passengers get on and off (e.g., a sight-seeing bus, a high-speed bus, a taxi, etc.), similar advantages can be obtained. In this case, a place that passengers get on and off corresponds to the bus stop in the preferred embodiment.

INDUSTRIAL APPLICABILITY

As has been described above, the present invention is particularly useful as an engine operation controller for a hybrid electric automobile that is applied to route buses.

What is claimed is:

1. An engine operation controller for a hybrid electric vehicle equipped at least with a motor and an engine, comprising:

speed detection means for detecting speed of the vehicle;

decision means for deciding whether or not a stop of the vehicle is a stop at a stopping place;

control means for prohibiting operation of said engine if it is detected by said speed detection means that said speed is less than a predetermined value, and delay means for delaying removal of the operation prohibition of said engine when it is decided by said decision means that said stop of said vehicle is a stop at a stopping place.

2. An engine operation controller for a hybrid electric vehicle equipped at least with a motor and an engine, comprising:

speed detection means for detecting speed of the vehicle;

decision means for deciding whether or not a stop of the vehicle is a stop at a stopping place;

control means for prohibiting operation of said engine if it is detected by said speed detection means that said speed is less than a predetermined value; and delay means for delaying removal of the operation prohibition of said engine when it is decided by said decision means that said stop of said vehicle is a stop at a stopping place, and door detection means for detecting an open or closed state of a door of the vehicle;

wherein, when an open or closed state of said door is detected by said door detection means, said decision means decides that a stop of the vehicle is a stop at a stopping place.

3. An engine operation controller for a hybrid electric vehicle equipped at least with a motor and an engine, comprising:

speed detection means for detecting speed of the vehicle;

door detection means for detecting an open or closed state of a door of the vehicle; and control means for controlling operation of said engine;

wherein, if it is detected by said speed detection means that said speed is less than a first predetermined value, operation of said engine is prohibited by said control means;

thereafter, when an open or closed state of the door is not detected by said door detection means, the operation prohibition of said engine is removed by said control means if said speed becomes equal to or greater than a second predetermined value which is greater than said first predetermined value; and when an open or closed state of the door is detected by said door detection means, the operation prohibition of said engine is removed by said control means if said speed becomes equal to or greater than a third predetermined value which is greater than said second predetermined value.

4. An engine operation controller for a hybrid electric vehicle equipped at least with a motor and an engine, comprising:

speed detection means for detecting speed of the vehicle;

door detection means for detecting an open or closed state of a door of the vehicle; and control means for controlling operation of said engine (4);

wherein, if it is detected by said speed detection means that said speed is less than a first predetermined value, operation of said engine is prohibited by said control means;

thereafter, when an open or closed state of the door is not detected by said door detection means, the operation prohibition of said engine is removed by said control means if a first predetermined time elapses; and when an open or closed state of the door is detected by said door detection means, the operation prohibition of said engine is removed by said control means if a second predetermined time greater than said first predetermined time elapses.

5. An engine operation controller for a hybrid electric vehicle equipped at least with a motor and an engine, comprising:

speed detection means for detecting speed of the vehicle;

door detection means for detecting an open or closed state of a door of the vehicle; and control means for controlling operation of said engine;

wherein, if it is detected by said speed detection means that said speed is less than a first predetermined value, operation of said engine is prohibited by said control means;

thereafter, when an open or closed state of the door is not detected by said door detection means, the operation prohibition of said engine is removed by said control means, if a first predetermined time elapses and, in addition, said speed becomes equal to or greater than a second predetermined value which is greater than said first predetermined value; and when an open or closed state of the door is detected by said door detection means, the operation prohibition of said engine is removed by said control means, if a second predetermined time greater than said first predetermined time elapses and, in addition, said speed becomes equal to or greater than a third predetermined value which is greater than said second predetermined value.

* * * * *